United States Patent [19]

Proctor et al.

[11] Patent Number: 5,939,855
[45] Date of Patent: Aug. 17, 1999

[54] POWER CONVERSION EQUIPMENT MONITOR/CONTROLLER METHOD AND APPARATUS

[75] Inventors: Richard L. Proctor, Seattle; Steven H. Kahle, Montlake Terrace; Warren D. Stokes, Sumner; Richard H. Young, Jr., Seattle, all of Wash.

[73] Assignee: Cruising Equipment, Inc., Seattle, Wash.

[21] Appl. No.: 08/898,881

[22] Filed: Jun. 27, 1997

Related U.S. Application Data

[63] Continuation of application No. 08/760,944, Dec. 9, 1996, abandoned, which is a continuation-in-part of application No. 08/300,979, Sep. 6, 1994, Pat. No. 5,583,413.

[51] Int. Cl.$^6$ .................. H02J 7/00; H02J 7/14
[52] U.S. Cl. .......................... 320/104; 320/132
[58] Field of Search .................. 320/104, 118, 320/123, 125, 128, 132, 134, 136, 163, DIG. 18, DIG. 21, FOR 104, FOR 105, FOR 138, FOR 147; 324/426, 427, 428, 432, 433; 307/9.1, 10.1; 340/636; 322/14, 28, 78; 429/90

[56] References Cited

U.S. PATENT DOCUMENTS

| | | | |
|---|---|---|---|
| 3,971,980 | 7/1976 | Jungfer et al. | 320/DIG. 21 X |
| 4,536,697 | 8/1985 | Johnston et al. | 322/14 |
| 4,929,931 | 5/1990 | McCuen | 320/161 X |
| 4,949,046 | 8/1990 | Seyfang | 324/427 |
| 5,032,825 | 7/1991 | Kuznicki | 320/136 X |
| 5,047,961 | 9/1991 | Simonsen | 320/150 X |
| 5,264,777 | 11/1993 | Smead | 320/126 |
| 5,321,627 | 6/1994 | Reher | 320/DIG. 21 X |
| 5,583,413 | 12/1996 | Proctor et al. | 320/5 |
| 5,583,416 | 12/1996 | Kiang | 320/22 |

*Primary Examiner*—Edward H. Tso
*Attorney, Agent, or Firm*—Christensen O'Connor Johnson & Kindness PLLC

[57] ABSTRACT

Power inverter equipment monitor/controller method and apparatus are described. The invented apparatus provides for the semi-automatic state steering and monitoring of an inverter/charger and alternator system. A flat panel user interface includes an array of switches, displays and indicators for establishing modes of operation of the system, for initializing operating parameters of the system and a connected battery, for establishing rates for the system's operation, permit the user to monitor the system's operating mode and charging data (including charging efficiency factor or CEF) while it is operating to charge the battery and to supply AC power to connected appliances. By the one of the preferred methods of the invention, ramping-up the alternator's output of current, sustaining the output until the voltage of the battery is acceptable, adjusting the output while maintaining the battery voltage at an acceptable level, reducing output until float level voltage is obtained and further adjusting output to maintain float level voltage to preserve the battery charge. By the other of the preferred methods, certain charge data related to the charging of the battery—including a present CEF, maximum amp-hour charge level capacity of the battery (AH CL capacity), and the present status of amp-hour charge level—are given and stored in memory, the battery is discharged, the lowest-recorded (LR) AH CL is recorded with recharge begins, completing the recharge and storing amount of amp-hours used to recharge, determining an intermediate CEF by dividing AH used-to-recharge battery by difference between the AH CL capacity and LR AH CL, averaging the present CEF with the intermediate CEF to produce a result which is stored in memory as the present CEF, and resetting present status to the AH CL capacity.

60 Claims, 4 Drawing Sheets

POWER CONVERSION EQUIPMENT MONITOR/CONTROLLER METHOD AND APPARATUS

This application is a continuation application of copending application Ser. No. 08/760,944, filed on Dec. 9, 1996, now abandoned which is a continuation-in-part of application Ser. No. 08/300,979 filed on Sep. 6, 1994, which issued on Dec. 10, 1996 as U.S. Pat. No. 5,583,413.

BACKGROUND

The present invention relates generally to power conversion equipment such as inverter and battery charger systems. More particularly, the invention concerns method and apparatus for semi-automatically and remotely monitoring the performance of and controlling such systems.

Power conversion equipment such as power inverters and battery chargers are known to provide for the efficient charging and recharging of batteries of both the wet-cell and gel-cell, so-called deep-cycle type. These batteries typically have a twelve volt (12V) or 24V capacity. One of the best known battery chargers uses three cycles including a first for bulk charging, a second for absorption or acceptance charging and a third for float charging, preferably in the listed order. Additionally, a fourth cycle for equalizing the charge of the battery may follow the float charging cycle upon command of a user.

During the bulk charging cycle, most of the charging current available from the charger is delivered to the battery bank, until such time as the upper charge limit is reached, thereby producing a rapid charging of the battery. During the absorption charging cycle, the battery voltage is held at the upper charge limit and the charging current is gradually ramped down.

During the float charging cycle, the charging current is curtailed and the charger monitors the battery voltage while it drifts down from the upper charge limit. In the float charging cycle, a constant battery voltage is maintained below the gassing point but above the resting voltage of the battery of a fully charged battery. The battery charger only supplies charging current when necessary to maintain the battery voltage. During the float charging cycle, the full output of the battery charger is available to operate any AC appliances that may be connected to the inverter/charger system.

Finally, during the equalizing charging cycle, periodically equalization is accomplished by applying an equalization current to the battery. Such causes wet cell batteries to gas profusely, the beneficial effects of which are removal of residual lead sulfate, restoring all cells to the same potential and mixing up the electrolyte.

Those of skill in the art will appreciate that even such advanced inverter/charger systems have no provision for user-specified monitoring and controlling levels at a conveniently located flat panel user interface fittable in a console of a marine or recreational vehicle, or fixable within an alternative energy residence.

SUMMARY OF INVENTION

The invented monitor/controller provides for the semi-automatic state steering and monitoring of an inverter/charger of the type described immediately above. A flat panel user interface includes an array of switches, displays and indicators for establishing modes of operation of the inverter/charger, for initializing operating parameters of the inverter/charger and a connected battery, for establishing rates for inverter/charger operation, and permit the user to monitor the operating mode, the charging cycle, the charging rate, the charge level and the charging efficiency of the battery system (which includes the inverter/charger and the battery) while it is operating to charge the battery and to supply AC power to connected appliances or loads.

In its preferred embodiment, the apparatus of the invention provides both a numeric liquid crystal display (LCD) and multiple light-emitting diodes (LEDs) as front panel indications of the system's operation. By the one of the preferred methods of the invention, an alternator and an inverter/charger are connected to the battery. They are steered by the monitor/controller to ramp-up the charging current, maintaining the charging current at a given limit until an acceptance voltage level is reached, then maintaining the battery's voltage at the acceptance voltage by controlling the charging current as the battery and load needs dictate. After the charging current falls below a given limit for a defined period of time and battery is determined to be fully charged, the charging current is controlled to maintain a lower float voltage level well below the gassing point of the battery to preserve the battery's charge.

By the other of the preferred methods of the invention, certain charge data related to the charging of the battery—including a present charge efficiency factor (CEF), maximum amp-hour charge level capacity of the battery, and the present status of amp-hour charge level—are given and stored in memory, the battery is discharged and the present status is decremented, beginning recharge of battery and storing the present status as the lowest-recorded amp-hour charge level, continuing the recharge of the battery and measuring the amp-hours used to recharge the battery and storing into memory as amp-hours used-to-recharge, completing the recharge, determining an intermediate CEF by dividing amp-hours used-to-recharge battery by difference between the maximum amp-hour charge level capacity and the lowest-recorded amp-hour charge level, averaging the present CEF with the intermediate CEF to produce a result which is stored in memory as the present CEF, and resetting the present status of amp-hour charge level to the maximum amp-hour charge level capacity of the battery.

These and other objects and advantages of the invention will be more fully understood by reference to the accompanying drawings and the detailed description to follow.

DETAILED DESCRIPTION OF THE PREFERRED EMBODIMENT

Figure 1:
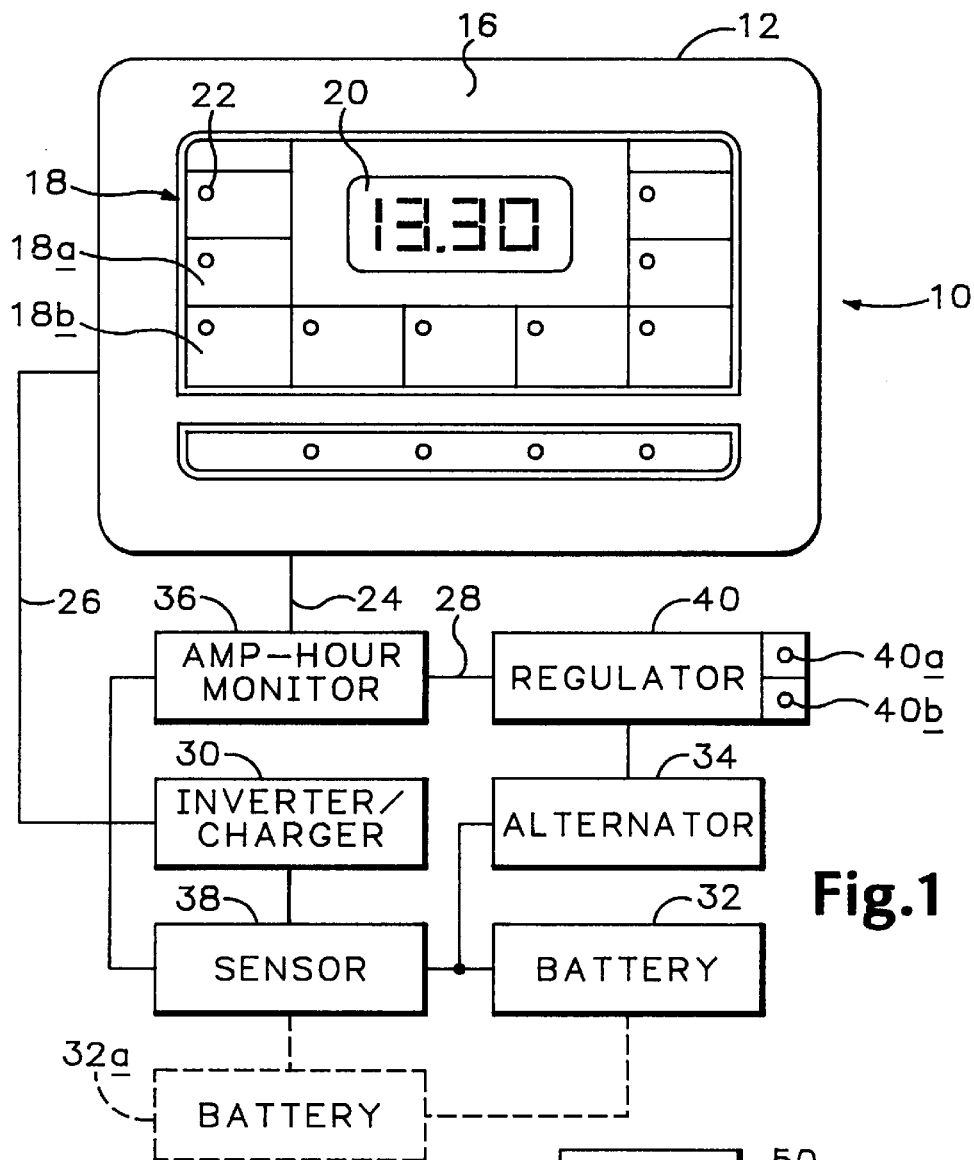
FIG. 1 is a system block diagram of the invented apparatus made in accordance with a preferred embodiment of the invention.

Referring to FIG. 1, the apparatus of the invention made in accordance with its preferred embodiment is indicated generally at 10. Apparatus 10 preferably includes a housing or enclosure 12 for electronic circuitry 14 (inside the housing and shown in FIG. 2). Preferably, housing 12 is lidded or closed by a flat-panel cover 16 providing an array of push-button switches such as 18a, 18b in the form of a molded keypad or keyboard 18, a display such as 4½-digit numeric liquid crystal display (LCD) 20 and an array of light-emitting diode (LED) indicators 22. Those skilled in the art will appreciate that housing 12 may take any of a variety of shapes, sizes and configurations, within the spirit and scope of the invention.

Preferably, apparatus 10 is adapted for console mounting or retrofit within the control console of a recreational or marine vehicle—or the wall of an alternative energy residence—and within reach by a ribbon cable 24 and a phone line 26 to an outboard regulator circuitry 40 via an outboard amp-hour monitor circuitry 36. The apparatus controls or regulates an alternator 34 via regulator circuitry 40 to which the alternator is connected. Apparatus 10 is preferably connected via a phone line 28 to an inverter/charger 30 which in turn is connected to one or more batteries 32, 32a. Alternatively, battery 32a may be a DC load or alternative power source such as a solar panel.

An alternator 34 is connected to one or more batteries 32, 32a to provide DC current to charge the batteries. Preferably, the alternator includes a sensor to measure the current produced by the alternator. The alternator, inverter/charger, and batteries are usually part of the vehicle's or residence's power subsystem.

Moreover, a current and voltage sensor 38 is connected to the battery (or batteries) to provide a means of measuring the current flowing through the battery and voltage across the battery. The sensor is connected to amp-hour monitor circuitry 36, and they are in communication with a microcontroller (described later) to function as an ammeter to measure the current flowing through the battery and a voltmeter to measure voltage across the battery. Preferably, the sensor includes a 500 amp/50 millivolt (50 mV) dual-shunt (a dual-shunt is used in a system with two batteries).

A regulator circuitry 40 for regulating an alternator is connected to amp-hour monitor circuitry 36 and alternator 34. The regulator circuitry preferably includes a high side field-effect-transistor (FET) driver with a voltage doubler and an alternator current buffer. Regulator circuitry 40 also includes an enablement LED indicator 40a for indicating S whether the regulation function is enabled or activated and an intensity-variable drive LED indicator 40b for indicating the relative intensity of the drive current that the regulator uses to control the alternator's output of current. The primary purpose of these LED indicators in the preferred embodiment is for status information and trouble-shooting.

Front panel push-button switches such as 18a, 18b (of which, as illustrated, there are more than two in the preferred embodiment of the invention) permit selection of measured or derived system variable to be displayed on LCD 20, and facilitate manual user control of the mode of operation, e.g. inverter versus charger mode, of the vehicle's power subsystem. LED indicators 22 are used to indicate various user selections and operational modes, thereby augmenting 4½-digit numeric LCD 20.

In accordance with the preferred embodiment of the invention, display options include voltage, amperage, amp-hours consumed, charging efficiency and various status indicators including AC power present and charge, acceptance and float modes of operation. Control options include idle mode load sensitivity selection, load-limiting power share AC current limit selection, set up, minimum fully battery voltage (acceptance voltage) selection, minimum fully charged current selection (fully-charged-indication current determined by a small percentage of the battery capacity), battery capacity selection, ambient temperature selection and start equalization selection. It will be appreciated that, within the spirit and scope of the invention, more or fewer, or altogether different, controls and indicators are contemplated.

Figure 2:
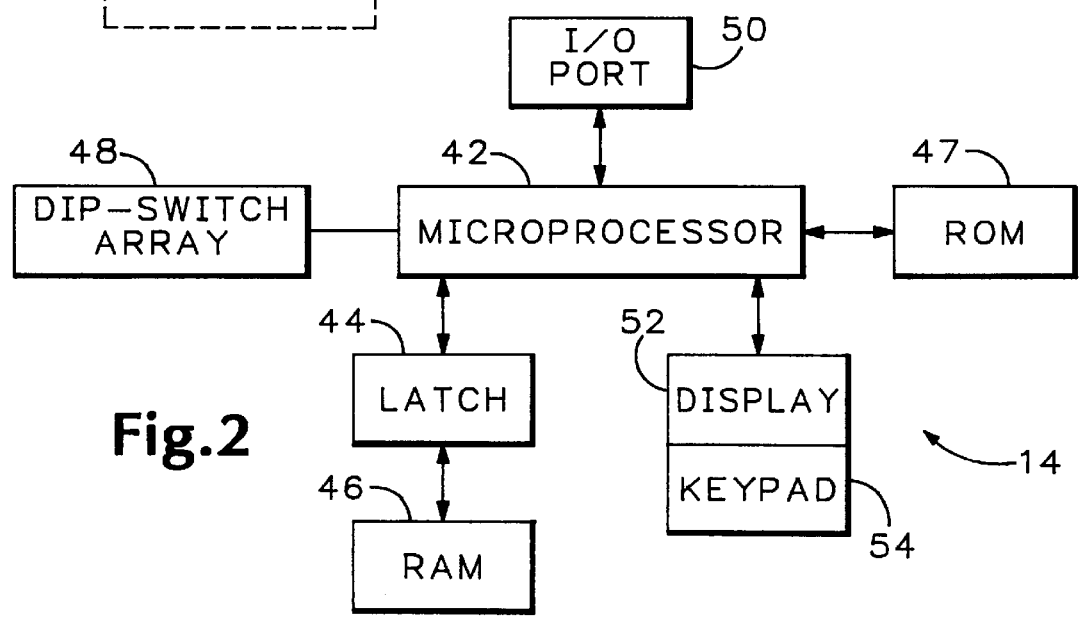
FIG. 2 is a schematic block diagram of the controller portion of the system illustrated in FIG. 1.

Referring now to the more detailed schematic diagram of FIG. 2, the heart of electronic circuitry 14 is a crystal oscillator-driven microcontroller 42 such as an 80C552 microprocessor, an address latch 44, a read-and-write memory (RAM) 46, a read-only-memory (ROM) 47, a dip-switch array 48, an input/output (I/O) port 50, a display 52, and a keypad 54. Display 52 includes LCD display 20 and LED indicators 22. Keypad 54 includes molded keyboard 18 and push-button switches 18a, 18b.

The microprocessor executes instructions stored in the illustrated onboard ROM performs all switch scanning and display functions, including driving the various LEDs and the LCD (which are part of display 52). The microprocessor also is programmed to perform the monitoring and control functions described above, by suitable programming techniques.

Referring collectively to FIGS. 1 and 2, I/O port 50 provides a means of communication with devices outside of enclosure 12 via a ribbon cable 24 and phone line 26. The I/O port provides a connection of electronic circuitry 14 of the apparatus to amp-hour monitor circuitry 36, regulator circuitry 40 (preferably via phone line 28 and the amp-hour monitor circuitry), and inverter/charger 30. The inverter/charger is preferably connected via standard telephone twisted-pair cabling 26 and transmits various status information to the microcontroller 42 regarding the status of the battery charging condition. The inverter/charger also receives commands from the microcontroller (based upon the user's input) directing the inverter/charger to perform various tasks including entering equalization mode, activating/deactivating the charging function, and activating/deactivating the inverting (DC-to-AC conversion) function.

Referring collectively to FIGS. 1 and 2, the apparatus is used with a battery charging system that includes the battery charger (inverter/charger) 30 for storing AC-to-DC converted electric power in one or more batteries 32, 32a connected thereto. Battery 32 has a charge level that is measured in amp-hours and a charge capacity measured in kilowatt-hours (kWhrs).

The apparatus has current and voltage sensor 38 and amp-hour monitor circuitry 36 in which provides a means of measuring the current flowing through the battery and a means of measuring voltage across the battery. The apparatus includes the microcontroller 42 which is connected to sensor 38 and inverted/charger 30. Connected to microcontroller is a memory for storing various charging data including present charging efficiency factor, a lowest-recorded amp-hour charge level, an a maximum amp-hour charge level capacity of the battery.

The microcontroller calculates the charging efficiency factor (CEF) of the battery charging system and battery and calculates the present state or status of the charge level of the battery measured in amp-hours. During the recharge of the battery, the microcontroller factors in the CEF when calculating the present status of the charge level. The microcontroller reports the results of its calculations, the current flowing through the battery and the voltage across the battery using a display connected thereto.

A new CEF may be recalculated each time the battery is recharged; however, in the preferred embodiment, the CEF recalculation only occurs when the battery was discharged at least ten percent before recharge and the battery has been fully recharged based on a measurement of the battery capacity in kWhrs. The preferred embodiment has the threshold requirement for recalculation of CEF to prevent skewed results based on partial recharges.

The microcontroller calculates an intermediate CEF by dividing the number of amp-hour used to charge the battery by the difference between the maximum amp-hour charge level capacity and the lowest-recorded amp-hour charge level and then averaging the present CEF with the intermediate CEF to produce a result which is stored in the memory (RAM) 46 as the present CEF—the result becomes the present CEF.

The apparatus has a keypad 54 which is connected to and scanned by microcontroller 42 and based on the user input on the keypad different information is displayed including battery voltage, battery current, present CEF, and present status of the amp-hour charge level.

Furthermore, the apparatus can function as a remote controller distally connected to inverter/charger 30. The user may set various setup parameters to control the inverter/charger. Some of setup parameters include an acceptance voltage, a fully-charged-indication current, a maximum amp-hour charge level capacity, an idle mode sensitivity of the inverter/charger and a load-limit AC power share of the inverter/charger. Also, the user can activate the equalization mode or cycle of the inverter/charger.

The default for the idle mode in the preferred embodiment is 4 Watts which means that it takes a four watt (4 W) AC load to turn the inverter on from its low power idle mode. The purpose of the power sharing feature is to automatically reduce the charger output, and therefore the AC power consumption, if the load passing through the inverter's automatic transfer switch exceeds the setup value. This load management feature helps prevent AC supply breakers from tripping when the vehicle's electric systems are plugged into AC power and the charger and other loads all come on at once.

Figure 3A:
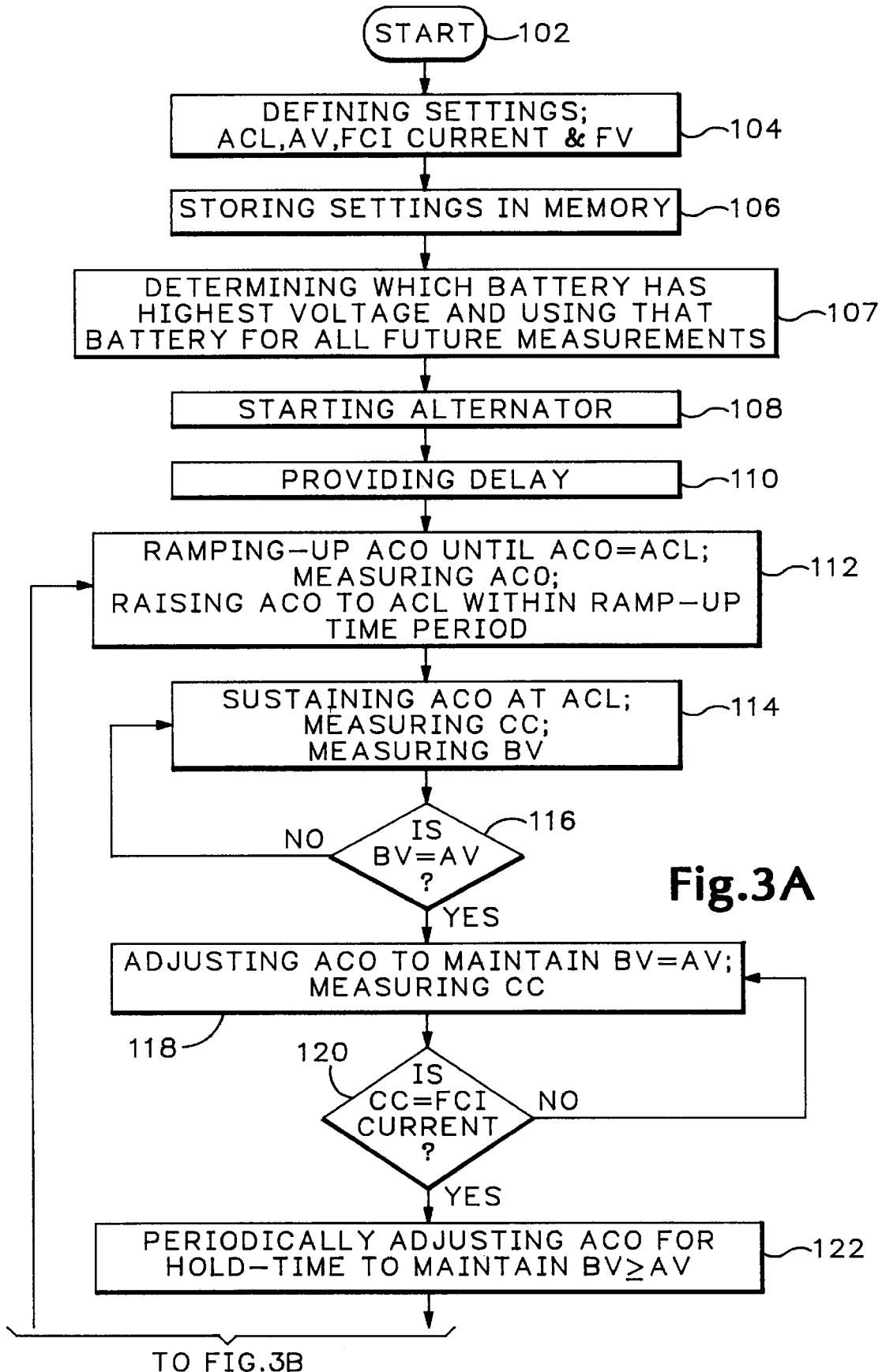
FIGS. 3A and 3B collectively are a high-level flowchart illustrating the first of the two preferred methods of the invention by which the controller operates.
Figure 3B:
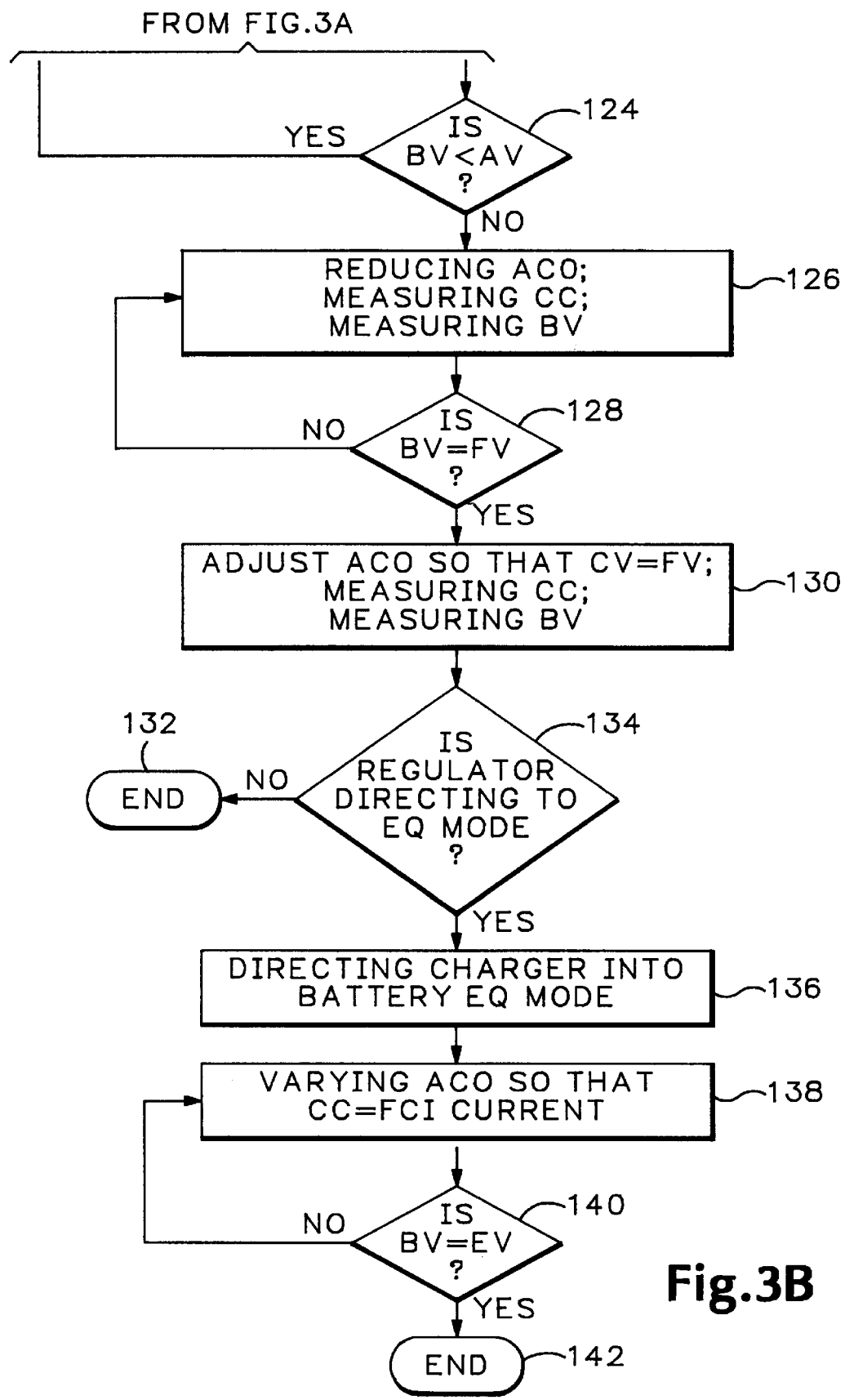

Referring now collectively to FIGS. 3A and 3B, the first of the preferred methods of the invention is illustrated by way of a flowchart. This is a method of regulating an alternator for use with a system that includes an alternator that supplies a variable current to a multi-cycle battery charger system connected thereto. The battery charger system includes a battery charger which is connected to a battery (to be charged) wherein the battery has a battery voltage that depends upon present charge condition of the battery. The voltage of the battery will be higher when the battery is fully charged than when the battery is discharged (i.e., less than fully charged). When the battery is fully charged, it has a maximum charge capacity measured in kWhrs.

This preferred method starts at 102 in FIG. 3A. At 104, the various settings are defined including alternator-current-limit (ACL), acceptance voltage (AV), fully-charged-indication current (FCI current) and float voltage (FV). The ACL is the maximum limit of the current that the alternator can produce and the AV is the voltage at which a battery is nearing its maximum charge but still accepting some charge (the default for the preferred embodiment is 14.4V for a 12V battery). The FV is less than the AV (default for the preferred embodiment is 13.5V for a 12V battery) and is the voltage that is sufficient to maintain the fully charged condition of the battery. The FCI current is preferably defined as a percentage of current of the battery capacity. At 106, these settings are stored into a memory connected to the regulator.

In the first preferred method of the invention, the voltage settings—including the AV and the FV—are modified or adjusted according to calculations based on several factors. The factors affecting the AV and the FV settings include the state of the charging cycle of the battery charger, the battery type (wet-cell or gel-cell) and the ambient temperature setting selected by the user.

In a system charging more than one battery, it is unlikely that all of the batteries will have equal charges and will recharge at the same rate. Also, over-charging a battery can cause damage and shorten the life of the battery. Therefore, the invention's preferred means of dealing with the danger of over-charging and the batteries' different charging characteristics is to base all battery current and battery voltage measurements upon the charging current and the battery voltage of the battery with the highest measured voltage 107.

In this preferred method of this invention used with a system charging more than one battery, the battery with the highest voltage may be redetermined before each battery current and battery voltage measurement. This redetermination is done to prevent over-charging of a battery that recharges at a faster rate than the other batteries.

After the alternator starts 108, there is a short delay 110 to allow time for the engine driving the alternator to start and allow for a slow increase in the PWM (pulse width modulation) of the AC-to-DC power conversion of the charger.

Continuing with the first preferred method of the invention, the ACO (alternator-current-output) is ramped-up until the ACO reaches or is substantially equal to the ACL (alternator-current-limit). The ACL is the maximum current output of the alternator and the default in the preferred embodiment is 100 amps. During the ramping-up, a sensor measures ACO and the regulator raises the ACO to the ACL within a defined ramp-up time period which is defined in firmware (ROM) as twenty to thirty seconds in the preferred embodiment of the invention. Those skilled in the art will appreciate that the defined ramp-up time period may be adjusted to suit the need of any particular type of inverter/charger system or alternator without departing from the spirit and scope of the present invention. The ramping-up of the ACO avoids shock-loading the belts by abruptly starting with full alternator output.

After the ACO is ramped-up to the ACL, the charge cycle begins. During the charge cycle the ACO is held or sustained 114 at ACL as the BV (battery voltage) of the battery increases. The ACO of the alternator, CC (charging current) and BV (battery voltage) of the battery are measured. The charge cycle continues until the BV is substantially equal to an AV (acceptance voltage). In the preferred embodiment of the present invention, the default value of the acceptance voltage is 14.4V (or 24.8V for 24V systems) or the AV can be defined by the user.

After the AV is reached, the acceptance cycle begins. During the acceptance cycle, the ACO is adjusted 118 and the CC is measured. The acceptance cycle guarantees thorough charging by continuing to charge the battery until the CC becomes a small percentage of battery capacity (default for preferred embodiment is 2%). This small percentage of battery capacity defines a fully-charged-indication current (FCI current). The acceptance cycle continues until the CC is substantially equal to the FCI current 120.

The acceptance cycle is followed by the acceptance hold cycle. During the acceptance hold cycle, the ACO is periodically adjusted 122 to maintain BV at or above AV for a hold-time and the CC is measured. The acceptance hold cycle makes sure that the battery has accepted as much charge as it can.

In the preferred embodiment, the hold-time is between five to fifteen minutes if the CC is continuously less than or equal to FCI current and BV is continuously greater than or equal to AV; otherwise, hold-time is eighteen to thirty minutes. Those skilled in the art will understand that the hold-time may be modified—it can even be user defined without departing from the spirit and scope to the present invention.

Referring now to FIG. 3B, if BV falls below FCI current 124, then the charge cycle begins again by returning to the ramping-up step 112. When the acceptance hold cycle ends (without a repeating of above steps), then the float transition cycle begins.

The float transition cycle begins at 126. The ACO is reduced, CC and BV are measured. Reducing the ACO at this point in the battery charging procedure causes the BV to decrease. The float transition cycle is intended to provide a continuous (i.e., without disruption) alternator output during the cycle change from acceptance to float; thus, avoiding an abrupt transition between these voltages insures that electronic tachometers supplied from the alternator continue to work during the transition. Once BV is substantially equal to a FV (float voltage) 128, then the float cycle begins.

The purpose of the float cycle is to provide a small amount of current when necessary to maintain the charge of the battery. During the float cycle, the ACO is further adjusted 130 so that BV continues to be substantially equal to FV. Also, CC and BV are measured. ACO is zero if BV remains substantially equal to FV but ACO is greater than zero when necessary to maintain BV at FV. The FV is below the gassing point of liquid (wet-cell) batteries and above the resting voltage of a fully charged battery. The float cycle continues until the battery is discharged 132, the regulator or system is deactivated 132 or the battery charger enters another cycle upon the direction of the regulator 134.

Once the system has reached the float mode, the battery is fully charged and can be used by any attached AC appliances. Once the battery is discharged (preferably, a minimum discharge of ten to fifty percent and a maximum discharge of fifty percent), the process can be repeated to recharge the battery using an alternator in a quick and efficient manner. The above described method of the preferred embodiment of the invention allows the deep-cycle batteries of a vehicle (boat or recreational vehicle (RV)) or an alternative energy residence, a remote site to be recharged without the need for a readily available AC outlet. The regulator controlled alternator provides the AC to the battery charger in the manner described above to produce a quick and efficient charge of the deep-cell batteries.

After several recharges, it is advisable to equalize (the advantages of equalization will be described later) a wet-cell battery—as opposed to a gel-cell battery. The equalization of a battery should follow a recharge of a battery. The method of the preferred embodiment regarding the equalization follows the float cycle.

Continuing to refer to FIG. 3B, the regulator directs 136 the battery charger into an equalization mode. During the equalization mode the battery voltage is increased causing the battery bank to gas profusely and will accomplish the following:

(1) Removal of residual sulfate. Each time a battery is cycled and recharged, a small amount of sulfate is left on the plates. Over time, this gradual build-up of sulfate will compromise the performance of the battery. By applying an equalizing charge, this sulfate is returned back to the electrolyte, raising the specific gravity and fully exposing the active material of the plates.

(2) Bring all cells to the same potential. All lead-acid batteries are made-up of individual two volt cells. As the battery bank is cycled, slight differences in the cells results in different cell voltages, affecting the overall charge effectiveness. Equalizing will serve to bring all cells up to the same voltage and the electrolyte in each cell to the same specific gravity.

(3) Mixing up of the electrolyte. There is a tendency in the cell of a battery for the electrolyte to separate into layers of acid and water. The vigorous boiling of the battery during equalizing serves to physically mix the electrolyte.

During the equalization cycle, the ACO is varied 138 so that CC remains substantially equal to FCI current. Also, CC and BV are measured. After a set period of time or when BV is substantially equal to an equalization voltage (EV) 140, then the equalization cycle ends 142. The EV is preferably higher than the AV.

Figure 4:
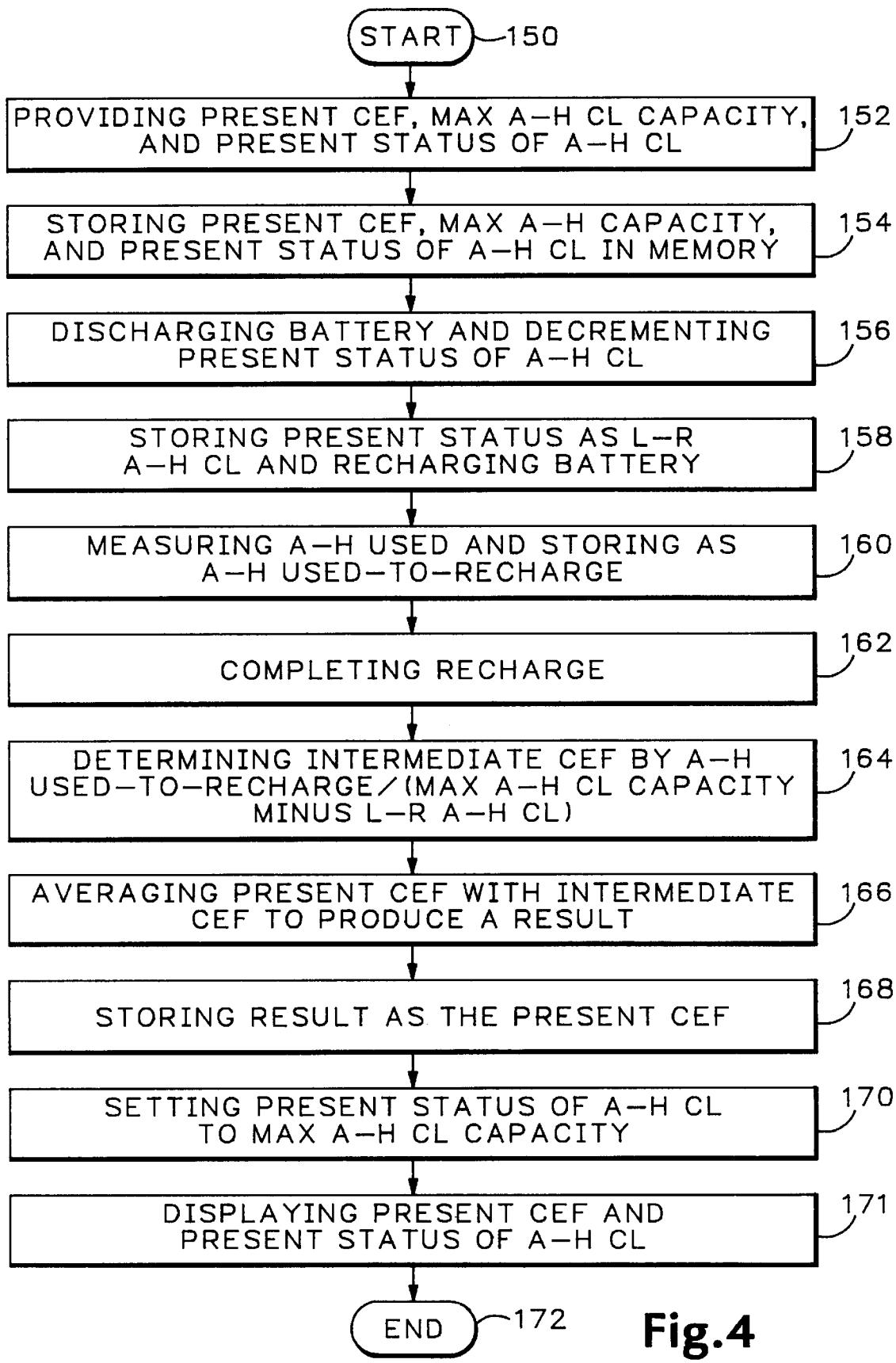
FIG. 4 is a high-level flowchart illustrating the second of the two preferred methods of the invention by which the controller operates.

Referring to FIG. 4, a flowchart illustrates the charge efficiency factor (CEF) calculation method of the preferred embodiment. The process beings at start 150. Necessary charging data is provided 152 including present CEF, maximum amp-hour charge level capacity (max. A-H CL capacity) and present status of amp-hour charge level of the battery (present status of A-H CL). The charging data is stored 154 in a memory.

While the battery is discharging 156, the present status of A-H CL is decremented. Immediately before the battery is recharged, the present status of A-H CL is stored in memory as the lowest-recorded amp-hour charge level (L-R A-H CL) 158. While the battery is recharging, the amp-hours used to recharge the battery is measured and stored 160 as amp-hours used-to-recharge (A-H used-to-recharge). Upon completion of recharge of the battery 162, the A-H used-to-recharge reflects the amount of amp-hours required to fully recharge the battery.

After complete recharge of the battery, a new CEF is calculated to replace the old CEF to account for the changing, dynamic nature of a deepcycle battery's life. In this preferred method this invention, a new CEF may be calculated if the battery was discharged a given amount (between eight and twelve percent in the preferred embodiment) and all of the charge (measured in kilowatt-hours or kWhrs) is restored to the battery.

An intermediate CEF is determined 164 by dividing the A-H used-to-recharge by the difference of the maximum A-H CL capacity and the L-R A-H CL. After the intermediate CEF is determined, it is averaged 166 with the present CEF to produce a result that is stored 168 as the new present CEF.

After the new present CEF is calculated, the present status of A-H CL is set 170 to be equal to the max. A-H CL capacity because of the changing CEF of the battery charging system and the battery. The present CEF and present status of A-H CL is displayed 171. After the reset of the present status of A-H CL and display, the process ends 172.

While the present invention has been shown and described with reference to the foregoing preferred method and embodiment, it will be apparent to those skilled in the art that other changes in form and detail may be made therein without departing from the spirit and scope of the invention as defined in the appended claims.

We claim:

1. For use with a system including an alternator that supplies a variable alternator-current-output to a connected battery with a multi-cycle battery charger connected thereto, wherein the battery has a battery voltage and receives a charging current, and wherein the alternator is controlled by a regulator, an alternator regulation method comprising:

ramping-up the alternator-current-output until the alternator-current-output reaches an alternator-current-limit;

sustaining the alternator-current-output substantially at the alternator-current-limit until the battery voltage is substantially at an acceptance voltage;

adjusting the alternator-current-output for maintaining the battery voltage substantially at the acceptance voltage, until the battery's charging current is substantially at a fully-charged-indication current;

reducing the alternator-current-output, which lowers the battery voltage, until the battery voltage is substantially at a float voltage; and further adjusting the alternator-current-output for maintaining the battery voltage substantially at the float voltage to preserve a fully charged condition of the battery.

2. The method of claim 1, wherein the system includes a sensor for measuring and a processor comparing, and wherein the regulator is connected to the sensor and the processor, the method further comprising:

a battery-current measuring of the charging current flowing through the battery;

an alternator-current measuring of the alternator-current-output;

a voltage measuring of the battery voltage across the battery;

an alternator-current comparing of the alternator-current-output to the alternator-current-limit;

a battery-current comparing of the charging current to the fully-charged-indication current;

an acceptance-voltage comparing of the battery voltage to the acceptance voltage; and a float-voltage comparing of the battery voltage to the float voltage.

3. The method of claim 2, wherein the ramping-up step includes an alternator-current measuring of the alternator-current-output and an alternator-current comparing of the alternator-current-limit thereto;

the sustaining step includes a battery-current measuring of the charging current, a voltage measuring of the battery voltage and an acceptance-voltage comparing of the acceptance voltage thereto;

the adjusting step includes a battery-current measuring of the charging current and a battery-current comparing of the fully-charged-indication current thereto;

the reducing step includes a battery-current measuring of the charging current, a voltage measuring of the battery voltage and a float-voltage comparing of the float voltage thereto; and the further adjusting step includes a battery-current measuring of the charging current, a voltage measuring of the battery voltage and a float-voltage comparing of the float voltage thereto.

4. The method of claim 2, wherein the system includes a first battery and a second battery with each having a voltage and receiving a charging current, and wherein the battery-current measuring steps and voltage measuring steps are preceded by:

a measuring of the first battery's voltage and the second battery's voltage;

a comparing of the first battery's voltage to the second battery's voltage; and a using of the first battery for measuring of the battery voltage and of the charging current if the first battery's voltage is greater than the second battery's voltage, otherwise a using of the second battery for measuring of the battery voltage and of the charging current.

5. The method of claim 1, which further comprises before the ramping-up step, a defining of settings for the alternator-current-limit, the acceptance voltage, the fully-charged-indication current and the float voltage, and a storing of the settings in a memory connected to the regulator.

6. The method of claim 5, wherein the setting defining the fully-charged-indication current is a percentage of battery capacity.

7. The method of claim 1, which further comprises before the ramping-up a starting of the alternator by the regulator, and a providing of a delay before the ramping-up.

8. The method of claim 1, which further comprises after adjusting, a step of periodically adjusting the alternator-current-output to maintain the battery voltage for a hold-time.

9. The method of claim 8, wherein the periodically adjusting step includes a repeating of the ramping-up, sustaining and adjusting steps if the battery voltage falls below the acceptance voltage.

10. The method of claim 1, wherein the ramping-up step includes a raising of the alternator-current-output to the alternator-current-limit within a defined ramp-up time period.

11. The method of claim 1, wherein the system further includes the regulator connected to the battery charger and after the further adjusting step, a directing of the battery charger into a battery electrolyte equalization mode, and a varying of the alternator-current-output to maintain the charging current substantially at the fully-charged-indication current, and a continuing of the varying of the alternator-current-output, which raises the battery voltage, until the battery voltage is substantially at an equalization voltage.

12. For use with a system including a battery charger, a battery, and a controller including a processor for storing into a memory connected thereto, the charge efficiency factor determination method comprising:

a providing of a present charge efficiency factor, a maximum amp-hour charge level capacity of the battery, and a present status of amp-hour charge level;

a storing of the present charge efficiency factor, the maximum amp-hour charge level capacity of the battery, and the present status of amp-hour charge level in the memory;

a discharging of the battery and while discharging, decrementing the present status of amp-hour charge level;

a recharging of the battery and a storing of the present status of amp-hour immediately before recharging in the memory as the lowest-recorded amp-hour charge level;

a measuring of amp-hours used to recharge battery and a storing in memory the amp-hours used as amp-hours used-to-recharge the battery;

a completing of the recharging of the battery;

a determining of an intermediate charge efficiency factor by dividing amp-hours used-to-recharge battery by difference between the maximum amp-hour charge level capacity and the lowest-recorded amp-hour charge level;

an averaging of the present charging efficiency factor with the intermediate charge efficiency factor to produce a result; and a storing of the result in memory as the present charging efficiency factor.

13. The method of claim 12, which further comprises, following the storing of the result, a step of setting the present status of amp-hour charge level to the maximum amp-hour charge level capacity.

14. The method of claim 12, for use with a display connected to the controller, which further comprises a displaying of the present charge efficiency factor and the present status of amp-hour charge level.

15. A battery charge monitoring apparatus for use with a battery charging system which includes a battery charger for storing AC-to-DC converted electric power in a battery connected thereto, wherein the battery has an amp-hour charge level, the apparatus comprising:

an ammeter connected to the battery, the ammeter for measuring current flow through the battery;

a processor for calculating a charge efficiency factor, wherein during a charging of the battery, the processor calculates a present status of the amp-hour charge level based on the charge efficiency factor and the processor is connected to the ammeter and connected to the battery charger; and a display that indicates the charge efficiency factor and the present status of the amp-hour charge level of the battery, wherein the display is connected to the processor.

16. The apparatus of claim 15, further comprising:

a memory connected to the processor, wherein the memory is for storing a present charge efficiency factor, a lowest-recorded amp-hour charge level and a maximum amp-hour charge level capacity of the battery, and wherein after the battery charger fully charges the battery, the processor calculates an intermediate charge efficiency factor by dividing amp-hours used to charge battery by an difference between the maximum amp-hour charge level capacity and the lowest-recorded amp-hour charge level and averaging the present charging efficiency factor with the intermediate charge efficiency factor to produce a result, and the processor stores the result into the memory as the present charging efficiency factor.

17. The apparatus of claim 15, which further comprises:

a voltmeter connected to the battery, the voltmeter for measuring voltage across the battery, and wherein the display further indicates a voltage across the battery and the current flow through the battery, wherein the voltage is measured by the voltmeter and the current flow is measured by the ammeter.

18. The apparatus of claim 17, further comprising a console including:

a processor-scanned keypad with keys, wherein the keypad is connected to and scanned by the processor, and the display, wherein the display further indicates a present status of charging data when a user selects a key on the keypad, wherein each key is associated one or more of the charging data and wherein the charging data include the voltage across the battery, the current flow through the battery, the present charge efficiency factor, and the present status of the amp-hour charge level of the battery.

19. The apparatus of claim 15, further comprising a regulator for regulating an alternator's current output, wherein the regulator is connected to the processor and to an alternator, and wherein the regulator includes an enablement indicator for indicating the enablement of the regulator and a drive indicator for indicating an intensity of a drive current that the regulator sends to the alternator for controlling operation of the alternator.

20. The apparatus of claim 15, further comprising a remote controller connected to the battery charging system, wherein the system includes an inverter/charger that includes the battery charger and an inverter, the controller including:

a processor-scanned keypad for receiving a user-input, wherein the keypad is connected to the processor, and the processor, wherein the processor is for scanning the keypad, storing setup parameters in a memory connected thereto, and controlling the inverter/charger based on the user-input and the setup parameters of the inverter/charger.

21. A microcontroller-based monitor and control unit for interconnection with an electrical power system of the type that includes an inverter for supplying an AC signal for powering alternating current electrical loads, a battery charger having input terminals for receiving an AC input signal from an AC power source, and one or more batteries, at least one of the one or more batteries connected for supplying current to one or more direct current loads that include the inverter, the at least one of the one or more batteries being connected for receiving a charging current that includes current supplied by the battery charger, the battery charger being of the type that provides a multi-state battery charging sequence in which the relationship between charging current produced by the battery charger and the terminal voltage produced by the battery charger across the terminals of the at least one battery is established during each particular state of the multi-state charging sequence by a control parameter, said microcontroller-based monitor and control unit comprising:

a programmable microprocessor operable in response to stored program instructions for selectively monitoring the terminal voltage of the at least one of the one or more batteries and for selectively monitoring the battery charging current supplied to the at least one of the one or more batteries and the current supplied by the at least one of the one or more batteries to the one or more direct current loads that include the inverter, said programmable microprocessor being further operable in response to stored program instructions for establishing the control parameter for at least one state of the multi-state charging sequence and for determining one or more power system status indications that include a state-of-charge indication for the at least one of the one or more batteries;

a display unit operably interconnected with said programmable microprocessor for selective display of said one or more power system status indications;

manually operable input means connected for supplying signals to said programmable microprocessor for establishing the control parameter for said at least one state of the multi-state charging sequence and for controlling said selective display of said one or more power system status indications by said display unit; and memory means for storing said program instructions for said programmable microprocessor and for storing the control parameter for said at least one state of the multi-state charging sequence.

22. The microcontroller-based monitor and control unit of claim 21 wherein said state-of-charge indication is representative of the present value of the number of ampere-hours that the at least one battery is capable of providing and said microprocessor means is operable in response to said stored program instructions for decrementing said state-of-charge indication in response to the current supplied by the at least one battery to the one or more direct current loads and is operable in response to said stored program instructions for incrementing said state-of-charge indication in response to the charging current received by the at least one battery.

23. The microcontroller-based monitor and control unit of claim 22 wherein said memory means stores a charge efficiency factor and said microprocessor means is operable in response to said stored program instructions for incrementing said state-of-charge indication by using said charge efficiency factor as a multiplicative factor in combination with the charging current supplied to the at least one battery.

24. The microcontroller-based monitor and control unit of claim 21 wherein the inverter and battery charger are an integrated unit.

25. The microcontroller-based monitor and control unit of claim 21 wherein the electrical power system includes at least two batteries connected for receiving the charging current and for supplying current to the one or more loads and wherein said microprocessor is responsive to said stored programmed instructions for monitoring the terminal voltage of each battery to determine the battery having the highest terminal voltage and is further responsive to said stored program instructions for monitoring the charging current supplied to the battery having the highest terminal voltage and the current supplied by that battery to the one or more direct current loads that include the inverter for use in determining said state-of-charge indication.

26. The microcontroller-based monitor and control unit of claim 25 wherein said memory means stores a charge efficiency factor and said microprocessor means is operable in response to said stored program instructions for incrementing said state-of-charge indication by using said charge efficiency factor as a multiplicative factor in combination with the charging current supplied to the battery having the highest terminal voltage.

27. The microcontroller-based monitor and control unit of claim 25 wherein the inverter is operable in a low power idle mode and a demand mode in which the inverter supplies demanded AC current, with the inverter switching from the low power idle to the demand mode when the AC current demanded of the inverter is greater than an idle mode control parameter and wherein said manually operable input means is operable for supplying signals to said programmable microprocessor for establishing the idle mode control parameter at a selected value; said programmable microprocessor being responsive to said signal supplied by said manually operable input means for storing said selected value of said idle mode control parameter in said memory.

28. The microcontroller-based monitor and control unit of claim 27 wherein the inverter and battery charger are an integrated unit.

29. The microcontroller-based monitor and control unit of claim 21 wherein the multi-state battery charging sequence includes:

(a) a bulk charge cycle during which the battery charger supplies a substantially constant current that is determined by a bulk charge control parameter to increase the battery terminal voltage to an acceptance voltage value that is established by an acceptance voltage control parameter;

(b) an acceptance charge cycle during which the battery charger supplies a charging current sufficient to maintain the battery terminal voltage substantially equal to the acceptance voltage that is established by said acceptance voltage control parameter; and (c) a float charge cycle during which the battery charger decreases the battery terminal voltage from the acceptance voltage established by said acceptance voltage control parameter to a float voltage value that is established by a float voltage control parameter, and current is supplied by the battery charger at a value sufficient to maintain the battery terminal voltage substantially equal to the float voltage value;

and wherein a default value is stored in said memory means for said bulk charge control parameter, said acceptance voltage control parameter, and said float voltage control parameter; said manually operable input means being operable for supplying signals to said programmable microprocessor for establishing one or more of said bulk charge control parameter, acceptance voltage control parameter, and float voltage control parameter at a selected value; said programmable microprocessor being further operable in response to said stored program instructions for substituting each selected bulk charge control parameter, selected acceptance voltage control parameter, and selected acceptance voltage control parameter for said default bulk charge control parameter, said default acceptance voltage parameter, and said default acceptance float voltage parameter.

30. The microcontroller-based monitor and control unit of claim 29 wherein said state-of-charge indication is representative of the present value of the number of ampere-hours that the at least one battery is capable of providing and said microprocessor means is operable in response to said stored program instructions for decrementing said state-of-charge indication in response to the current supplied by the at least one battery to the one or more direct current loads and is operable in response to said stored program instructions for incrementing said state-of-charge indication in response to the charging current received by the at least one battery.

31. The microcontroller-based monitor and control unit of claim 29 wherein said memory means stores a charge efficiency factor and said microprocessor means is operable in response to said stored program instructions for incrementing said state-of-charge indication by using said charge efficiency factor as a multiplicative factor in combination with the charging current supplied to the at least one battery.

32. The microcontroller-based monitor and control unit of claim 29 wherein the multi-state battery charging sequence further includes an equalization charge cycle during which the battery charger maintains the battery terminal voltage at a predetermined equalization voltage, said memory means stores said equalization voltage value and said manually operable input means is operable for supplying a signal for initiation of the battery charger equalization cycle.

33. The microcontroller-based monitor and control unit of claim 29 wherein the multi-state battery charging sequence includes an acceptance hold cycle that is initiated to terminate the acceptance charge cycle when the current supplied to the battery reaches a fill charge value with the battery charger maintaining the battery terminal voltage at least equal to the acceptance voltage for a predetermined period of time and said memory means stores said full charge value.

34. The microcontroller-based monitor and control unit of claim 33 wherein said microprocessor is responsive to said stored program instructions for maintaining the battery charger in the acceptance hold cycle for a first predetermined period of time when the current supplied to the battery is continuously at or below the full charge value throughout said first predetermined period of time and said microprocessor is further responsive to said stored program instructions for maintaining the battery charger in the acceptance hold cycle for a second predetermined period of time that is greater than said first predetermined period of time when the current supplied to the battery is not continuously above the full charge value during said first predetermined period of time.

35. The microcontroller-based monitor and control unit of claim 29 wherein the inverter is operable in a low power idle mode and a demand mode in which the inverter supplies demanded AC current, with the inverter switching from the low power idle to the demand mode when the AC current demanded of the inverter is greater than an idle mode control parameter and wherein said manually operable input means is operable for supplying signals to said programmable microprocessor for establishing the idle mode control parameter at a selected value; said programmable microprocessor being responsive to said signal supplied by said manually operable input means for storing said selected value of said idle mode control parameter in said memory.

36. The microcontroller-based monitor and control unit of claim 35 wherein the inverter and battery charger are an integrated unit.

37. The microcontroller-based monitor and control unit of claim 29 wherein the electrical power system includes an alternator and a regulator connected for controlling the output current supplied by the alternator, the alternator being operable for supplying charging current to the at least one of the one or more batteries and wherein said microprocessor is responsive to said programmed instructions for controlling the output current of the alternator to implement a multi-state charging sequence having a bulk charge cycle during which the alternator supplies a substantially constant current, an acceptance charge cycle during which the alternator supplies a charging current sufficient to maintain the battery terminally voltage substantially equal to the acceptance voltage, and a float charge cycle during which the alternator decreases the battery terminal voltage from the acceptance voltage to the float voltage value.

38. The microcontroller-based monitor and control unit of claim 37 wherein said microprocessor is further responsive to said stored program instructions for initiating each bulk charge cycle with a current ramp that increases to a maximum battery charging current.

39. The microcontroller-based monitor and control unit of claim 37 wherein said state-of-charge indication is representative of the present value of the number of ampere-hours that the at least one battery is capable of providing and said microprocessor means is operable in response to said stored program instructions for decrementing said state-of-charge indication in response to the current supplied by the at least one battery to the one or more direct current loads and is operable in response to said stored program instructions for incrementing said state-of-charge indication in response to the charging current received by the at least one battery.

40. The microcontroller-based monitor and control unit of claim 39 wherein said memory means stores a charge efficiency factor and said microprocessor means is operable in response to said stored program instructions for incrementing said state-of-charge indication by using said charge efficiency factor as a multiplicative factor in combination with the charging current supplied to the at least one battery.

41. The microcontroller-based monitor and control unit of claim 40 wherein the multi-state battery charging sequence further includes an equalization charge cycle during which the battery charger maintains the battery terminal voltage at a predetermined equalization voltage, said memory means stores said equalization voltage value and said manually operable input means is operable for supplying a signal for initiation of the battery charger equalization cycle.

42. The microcontroller-based monitor and control unit of claim 41 wherein the multi-state battery charging sequence includes an acceptance hold cycle that is initiated to terminate the acceptance charge cycle when the current supplied to the battery reaches a full charge value with the battery charger maintaining the battery terminal voltage at least equal to the acceptance voltage for a predetermined period of time and said memory means stores said fall charge value.

43. The microcontroller-based monitor and control unit of claim 37 wherein the electrical power system includes at least two batteries connected for receiving the charging current and for supplying current to the one or more loads and wherein said microprocessor is responsive to said stored programmed instructions for monitoring the terminal voltage of each battery to determine the battery having the highest terminal voltage and is further responsive to said stored program instructions for monitoring the charging current supplied to the battery having the highest terminal voltage and the current supplied by that battery to the one or more direct current loads that include the inverter for use in determining said state-of-charge indication.

44. The microcontroller-based monitor and control unit of claim 42 wherein the electrical power system includes at least two batteries connected for receiving the charging current and for supplying current to the one or more loads and wherein said microprocessor is responsive to said stored programmed instructions for monitoring the terminal voltage of each battery to determine the battery having the highest terminal voltage and is further responsive to said stored program instructions for monitoring the charging current supplied to the battery having the highest terminal voltage and the current supplied by that battery to the one or more direct current loads that include the inverter for use in determining said state-of-charge indication.

45. A monitor and control unit for interconnection and use with an electrical power system of the type having an inverter for supplying AC power, the inverter being connected to a battery that provides DC current that includes at least a drive current for the inverter and the battery being connected for periodically receiving charging current that includes at least current that is supplied by a multi-state battery charger that is connectable to an AC power source, the multi-state battery charger being operable to provide a bulk charge cycle during which the multi-state battery charger supplies a substantially constant bulk charge current to increase the battery terminal voltage to an acceptance voltage value, the multi-state battery charger further being operable to provide an acceptance charge cycle during which the multi-state battery charger supplies a charging current sufficient to maintain the battery terminal voltage substantially equal to the acceptance voltage value, the multi-state battery charger being additionally operable to provide a float cycle during which the multi-state battery charger decreases the battery terminal voltage from the selected acceptance voltage value to a float voltage value, and supplies charging current sufficient to maintain the battery terminal voltage substantially equal to the float voltage value, said monitor and control unit connectable to the electrical power system for receiving signals representative of the battery terminal voltage and for receiving signals representative of the charging current supplied to the battery and the DC current supplied by the battery, said monitoring and control unit comprising:

input means operable for selecting one or more operational parameters of the electrical power system from a group of operational parameters that includes a desired value for the substantially constant bulk charge current supplied by the multi-state battery charger during the bulk charge cycle, a desired value for the acceptance voltage value, and a desired value for the float voltage value;

a display unit for displaying current and voltage values during operation of said input means to select one or more of said operational parameters of the electrical power system, said display unit also for displaying a battery state-of-charge value indicative of the charge condition of the battery;

a microprocessor connected for receiving the signals representative of the battery terminal voltage and the signals representative of the charging current supplied to the battery and the DC current supplied by the battery, said microprocessor being responsive to stored program instructions for operative interaction with said input means and said display unit for establishing one or more the operational parameters of the electrical power system at a desired value and being responsive to stored program instructions for determining and displaying said battery state-of-charge value based upon said signals representative of the charging current supplied to the battery and the DC current supplied by the battery; and memory means interconnected with and operationally interactive with said microprocessor, said memory means for storing said program instructions and said operational parameters of the electrical power system, including any desired value established by operation of said input means for the substantially constant bulk charge current supplied by the multi-state battery charger during operation of the multi-state battery charger in the bulk charge cycle, any desired value established for the acceptance voltage value and any desired value established for the float voltage value, said memory means further including means for storing at least the present value of said battery state-of-charge value.

46. The monitor and control unit of claim 45 wherein said state-of-charge value is representative of the present value of the number of ampere-hours that the battery is capable of providing and said microprocessor is operable in response to said stored program instructions for decrementing said state-of-charge indication in response to the DC current that includes at least the drive current for the inverter and is operable in response to said stored program instructions for incrementing said state-of-charge indication in response to the charging current received by the battery.

47. The monitor and control unit of claim 46 wherein said memory means stores a charge efficiency factor and said microprocessor is operable in response to said stored program instructions for incrementing said state-of-charge indication by using said charge efficiency factor as a multiplicative factor in combination with the charging current supplied to the at least one battery.

48. The monitor and control unit of claim 47 wherein the battery is characterized by a maximum state-of-charge value and said microprocessor is responsive to said stored program instructions for updating said charge efficiency factor during selected periods of time in which charging current is supplied to the battery by determining an intermediate charge efficiency factor that is equal to the amount of charge supplied to the battery during the selected period of time divided by a quantity equal to the maximum state-of-charge value of the battery minus the state-of-charge value existing at the beginning of the selected period of time, and by determining the average value of the value of said charge efficiency factor existing during the selected period in which charging current is supplied to the battery and said intermediate charge efficiency factor and by replacing the value of charge efficiency factor stored in said memory means with said average value.

49. The monitor and control unit of claim 45 wherein the electrical power system includes first and second batteries that provide DC current and receive charging current and wherein said microprocessor is responsive to said stored program instructions for monitoring the terminal voltages of the first and second batteries to determine the battery having the highest terminal voltage and is further responsive to said stored program instructions for monitoring the charging current supplied to the battery having the highest terminal voltage and the DC current provided by that battery for use in determining said battery state-of-charge value.

50. The monitor and control unit of claim 49 wherein the inverter and battery charger are an integrated unit.

51. The monitor and control unit of claim 50 wherein said state-of-charge value is representative of the present value of the number of ampere-hours that the battery is capable of providing and said microprocessor is operable in response to said stored program instructions for decrementing said state-of-charge indication in response to the DC current that includes at least the drive current for the inverter and is operable in response to said stored program instructions for incrementing said state-of-charge indication in response to the charging current received by the battery.

52. The monitor and control unit of claim 51 wherein said memory means stores a charge efficiency factor and said microprocessor is operable in response to said stored program instructions for incrementing said state-of-charge indication by using said charge efficiency factor as a multiplicative factor in combination with the charging current supplied to the at least one battery.

53. The monitor and control unit of claim 52 wherein the battery is characterized by a maximum state-of-charge value and said microprocessor is responsive to said stored program instructions for updating said charge efficiency factor during selected periods of time in which charging current is supplied to the battery by determining an intermediate charge efficiency factor that is equal to the amount of charge supplied to the battery during the selected period of time divided by a quantity equal to the maximum state-of-charge value of the battery minus the state-of-charge value existing at the beginning of the selected period of time, and by determining the average value of the value of said charge efficiency factor existing during the selected period in which charging current is supplied to the battery and said intermediate charge efficiency factor and by replacing the value of charge efficiency factor stored in said memory means with said average value.

54. A microprocessor implemented method for controlling and monitoring a remotely located power conversion system that includes a battery for supplying DC current to one or more DC loads that include an inverter for supplying AC current to one or more AC loads, the battery being connected to a multi-state battery charger that provides a sequence of battery charging cycles in which the current supplied by the battery charger during each cycle of the battery charging sequence is determined by a control parameter that is associated with that particular cycle of the battery charging sequence, said method for monitoring and controlling comprising the steps of:

storing at least a portion of the control parameters for the cycles of the multi-state charging sequence in a memory of a microprocessor that is operably coupled to the multi-state battery charger for controlling the charging current during at least a portion of the multi-state battery charging sequence;

storing in the memory of the microprocessor a battery state-of-charge value that is representative of the then present charge state of the battery;

monitoring with the microprocessor the current supplied to the remotely located battery during operation of the battery charger during each cycle of the multi-state battery charging sequence to determine when the current supplied to the battery by the battery charger is less than a predetermined current that indicates that the battery is fully charged;

incrementing the battery state-of-charge value that is stored in memory when the multi-state battery charger is operating in each cycle of the multi-state battery charging sequence to maintain said battery state-of-charge indication substantially equal to the amount of charge stored by the battery;

monitoring with the microprocessor the current supplied to the inverter by the battery when the inverter is supplying AC current to the one or more AC loads; and decrementing the stored value of the battery state-of-charge indication when the inverter supplies AC current to one or more AC loads to maintain the stored value of said battery state-of-charge indication substantially equal to the charge condition of the battery.

55. The method of claim 54 further comprising the steps of:

monitoring with the microprocessor the battery voltage to determine when the battery voltage is less than a predetermined charge initiation value; and supplying a signal from the microprocessor to initiate the multi-state battery charging sequence when the battery voltage is less than said predetermined value.

56. The method of claim 55 further comprising the step of initially storing said predetermined charge initiation value in the memory of the microprocessor.

57. The method for controlling and monitoring a remotely located power conversion system of claim 54 wherein at least a portion of the control parameters stored in the memory of the microprocessor are default values for the remotely located power conversion system and said method further comprises the steps of selectively substituting desired control parameter values for one or more of said stored default values to thereby control the operation of the multi-state battery charging sequence.

58. The method for controlling and monitoring a remotely located power conversion system of claim 55 further comprising the step of selectively displaying the battery terminal voltage, the current supplied to the battery during operation of the battery charger, the current supplied to the inverter by the battery, and at least a portion of the control parameters for the cycles of the multi-state charging sequence.

59. The method for controlling and monitoring a remotely located power conversion system of claim 54 further comprising the steps of:

storing in the microprocessor memory an initial charge efficiency factor representative of the ratio between the amount of charge stored in the battery in response to the current supplied to the battery during each cycle of the battery charging sequence and the amount of charge supplied to the battery during the charging sequence; and using the charge efficiency factor as a multiplicative element in incrementing said battery state-of-charge value that is stored in the microprocessor memory when the multi-state battery charger is operating in each cycle of the multi-state battery charging sequence.

60. The method for controlling and monitoring a remotely located power conversion system of claim 57 further comprising the steps of:

determining an initial charge efficiency factor for the battery;

storing the initial charge efficiency factor in the microprocessor memory as the existing charge efficiency factor;

determining the value of the battery state-of-charge value at initiation of a battery charging sequence;

storing said value of the battery state-of-charge value in the microprocessor memory as a lowest recorded charge condition;

determining an immediate charge efficiency factor equal to the amount of charge supplied to the battery during the battery charging sequence divided by a quantity that is equal to the initial state-of-charge of the battery minus said lowest recorded charge level;

determining the average between the existing charge efficiency factor and the intermediate efficiency factor; and replacing the existing charge efficiency factor in the microprocessor memory by said average.

* * * * *

UNITED STATES PATENT AND TRADEMARK OFFICE
CERTIFICATE OF CORRECTION

PATENT NO. : 5,939,855
DATED : August 17, 1999
INVENTOR(S) : R.L. Proctor et al.

It is certified that error appears in the above-identified patent and that said Letters Patent is hereby corrected as shown below:

| COLUMN | LINE | |
|---|---|---|
| [57] Pg. 1, col. 2 | Abstract 2 of text | "invented" should read --inverter-- |
| [57] Pg. 1, col. 2 | Abstract 9 of text | "permit" should read --for permitting-- |
| [57] Pg. 1, col. 2 | Abstract 25 of text | "with" should read --when-- |
| 9 (Claim 2, | 36 line 2) | after "processor" insert --for-- |
| 10 (Claim 7, | 24 line 2) | after "ramping-up" insert --step,-- |
| 11 (Claim 16, | 49 line 9) | "an difference" should read --a difference-- |
| 12 (Claim 18, | 3 line 7) | after "associated" insert --with-- |
| 15 (Claim 37, | 46 line 13) | "terminally voltage" should read --terminal voltage-- |

UNITED STATES PATENT AND TRADEMARK OFFICE
CERTIFICATE OF CORRECTION

PATENT NO. : 5,939,855
DATED : August 17, 1999
INVENTOR(S) : R.L. Proctor et al.

It is certified that error appears in the above-identified patent and that said Letters Patent is hereby corrected as shown below:

COLUMN    LINE

17    30    after "more" insert --of--
(Claim 45, line 51)

Signed and Sealed this

First Day of August, 2000

Attest:

Q. TODD DICKINSON

*Attesting Officer*    *Director of Patents and Trademarks*